United States Patent [19]

Weisse et al.

[11] 3,890,434

[45] June 17, 1975

[54] HAIR AND ANTISEPTIC FORMULATIONS CONTAINING ADDUCTS OF BIS-(2-PYRIDYL-1-OXIDE) DISULFIDE

[75] Inventors: Guenther K. Weisse, Northford; Haywood Hooks, Jr., West Haven; Gene A. Hyde, Hamden; Samuel I. Trotz, Orange, all of Conn.

[73] Assignee: Olin Corporation, New Haven, Conn.

[22] Filed: Mar. 28, 1974

[21] Appl. No.: 455,688

Related U.S. Application Data

[62] Division of Ser. No. 190,382, Oct. 18, 1971, Pat. No. 3,818,018.

[52] U.S. Cl. ........ 424/70; 252/DIG. 2; 252/DIG. 3; 252/DIG. 13; 252/DIG. 14; 252/106; 260/270; 260/294.8 J; 424/DIG. 2; 424/DIG. 4; 424/245; 424/263
[51] Int. Cl. ............................................. A61k 7/06
[58] Field of Search ....... 260/270, 294.8 J; 424/245, 424/263, DIG. 4, 70; 252/106

[56] References Cited
UNITED STATES PATENTS

| | | | |
|---|---|---|---|
| 2,742,476 | 4/1956 | Bernstein et al. | 260/294.8 J |
| 3,027,372 | 3/1962 | Starrs | 260/270 |
| 3,236,733 | 2/1966 | Karsten et al. | 424/263 |
| 3,346,578 | 10/1967 | Langlykke et al. | 424/263 X |
| 3,412,033 | 11/1968 | Karsten et al. | 424/263 X |
| 3,427,382 | 2/1969 | Haefele | 424/71 |
| 3,498,985 | 3/1970 | Kaufman et al. | 424/245 X |
| 3,769,398 | 10/1973 | Hewitt | 424/70 |
| 3,773,770 | 11/1973 | Damico | 424/245 X |

*Primary Examiner*—Albert T. Meyers
*Assistant Examiner*—Vera C. Clarke
*Attorney, Agent, or Firm*—Robert L. Andersen

[57] ABSTRACT

This invention pertains to adducts of bis-(2-pyridyl-1-oxide) disulfide with alkaline earth metal salts in hair and antiseptic formulations.

26 Claims, No Drawings

HAIR AND ANTISEPTIC FORMULATIONS CONTAINING ADDUCTS OF BIS-(2-PYRIDYL-1-OXIDE) DISULFIDE

This is a division of application Ser. No. 190,382, filed Oct. 18, 1971, now U.S. Pat. No. 3,818,018.

This invention relates to adducts of bis-(2-pyridyl-1-oxide) disulfide and derivatives thereof and their method of preparation. More particularly, this invention relates to alkaline earth metal salt adducts of the aforementioned disulfide compounds having enhanced biocidal properties and to formulations containing such adducts.

Bis-(2-pyridyl-1-oxide) disulfide (also referred to as 2,2'-dithiodipyridine-1,1'-dioxide) and various derivatives thereof have been previously disclosed in the literature. For example, U.S. Pat. No. 2,742,476 discloses bis-(2-pyridyl-1-oxide) disulfide and lower alkyl substituted derivatives thereof. U.S. Pat. No. 3,027,371 discloses molybdate derivatives, U.S. Pat. No. 3,027,372 discloses stannous chloride derivatives, and U.S. Pat. No. 3,346,578 discloses stannous fluoride derivatives of bis-(2-pyridyl-1-oxide) disulfide and each refer to the antifungal and anitbacterial properties of said derivatives. In addition to the above-noted disulfide compounds, many other compounds have been used as biocides in various type preparations. However, most compounds are often characterized by one or more undesirable properties such as (1) insolubility or low solubility in water making them unusable in clear type formulations, (2) irritating to skin, (3) unpleasant odor, (4) unstable under desired use conditions, e.g. at a pH greater than about 5.

Now is has been found that adducts having a broad range of biocidal activity can be provided according to this invention. More specifically, these adducts have the formula:

(I)

wherein M is an alkaline earth metal, Y is the anion of an inorganic or organic acid and $t$ is either 1 or 2. More particularly, the adducts (I) contain an alkaline earth metal (M) selected from the group consisting of calcium, magnesium, barium and strontium with calcium and magnesium being preferred and the anion (Y) is selected from the group consisting of halides, sulfates, nitrates, chlorates and acetates with the chlorides and sulfates being preferred. More particularly preferred are the adducts of calcium chloride ($CaCl_2$) or magnesium sulfate ($MgSO_4$). Also included in the adducts of this invention are hydrates of the aforementioned compounds, i.e. adducts including $nH_2O$ groups where $n$ is an integer of 0 to 10. Additionally, the adducts (I) may contain one or more substituents on either or both pyridine ring structures such as alkyls, halogens and alkoxy groups. Reference to the adducts (I) in the specification and claims is intended to include compounds containing such substituents. It is further noted that $(C_5H_4NOS)_2$ as used in (I) above and throughout the specification and claims represents bis-(2-pyridyl-1-oxide) disulfide and has the structural formula shown below:

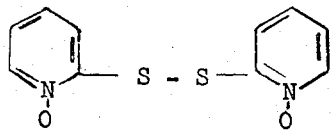

The adducts (I) of this invention are prepared by reacting a selected alkaline earth metal salt with bis-(2-pyridyl-1-oxide) disulfide or a derivative thereof in the presence of an inert solvent. More particularly, the inert solvent used can be an organic alcohol, preferably a lower alkanol of 1 to 4 carbon atoms and more preferably an alkanol of 2 to 4 carbon atoms. Mixtures of such alkanols with water or other solvents may also be used if desired. The reaction mixture is generally maintained at a pH of about 1 to about 8 and preferably from about 2 to about 5. The amounts of alkaline earth metal salt and bis-(2-pyridyl-1-oxide) disulfide which are utilized can be varied with a molar ratio of about 0.5:1 to about 2:1 of salt to disulfide being most generally used. Preferably, the amount used will be equimolar or have a slight excess of the alkaline earth metal salt.

The adducts (I) of this invention are useful as antimicrobial agents because they exhibit high biological activity against a broad spectrum of microorganisms. Additionally, these adducts have been shown to be substantive to calf skin, i.e. the property of remaining on the skin and retaining biocidal activity over a period of time after washing and rinsing of the skin. It is further noted that these adducts have the desirable characteristic of being soluble in water and surfactant solutions, thus, they may be used in a wide variety of cosmetic preparations such as hair shampoos, hair dressings, hair preparations, antidandruff preparations, wave sets, lotions, creams, etc. More particularly, because of the desirable high solubility of the adducts (I) in aqueous solutions, they may be used in many clear type formulations such as clear hair shampoos.

While a wide variety of cosmetic formulations may be used a typical formulation for a hair shampoo would include from about 10 to about 85% of a synthetic detergent; from 0 to about 10% of a foam builder; from 0 to about 5% of a viscosity control agent; from about 0.0001 to about 10% of the adducts of this invention (I); from 0 to about 15% of other ingredients well known to those skilled in the art, such as conditioners, pH control agents, colors, perfumes, clarifying agents, finishing agents, sequestering agents, protein derivatives, etc. and the balance of the formulation being water, more particularly from 0 to about 89%. The above percents are on a weight basis.

In the above hair shampoo compositions the synthetic detergent may be selected from one or more detergents found in the classes known as anionic, cationic, non-ionic and amphoteric detergents.

Anionic detergents which are useful include alkyl aryl sulfonates, alkyl glyceryl ether sulfonates, alkyl sulfates, long chain (fatty) alcohol sulfates, alkyl monoglyceride sulfates or sulfonates, alkyl polyethoxy ether sulfates, acyl sarcosinates, acyl esters of isothionates, acyl N-methyl taurides, alkyl benzene sulfonates, and alkyl phenol polyethoxy sulfonates. In these compounds the alkyl and acyl groups, respectively, generally contain from 10 to 20 carbon atoms. They are used in the form of water-soluble salts, the sodium, potassium, ammonium, and alkanol-ammonium salts, for example. Specific examples are sodium lauryl sulfate, potassium N-methyl lauroyl tauride, and triethanolamine dodecyl benzene sulfonate.

Suitable examples of cationic detergents are dilauryldimethyl ammonium chloride, diisobutyl phenoxy ethoxy ethyl dimethylbenzyl ammonium chloride, cetyl trimethyl ammonium bromide, N-cetyl pyridinium bromide and benzethonium chloride, which are classed as quaternary ammonium salts.

Suitable examples of non-ionic detergents include alkoxy (ethyleneoxy) ethanol, polyethylene glycol 400 distearate, fatty acid amines with 2–200 moles of ethylene oxide, sorbitan monolaurate, polyoxyethylene 4 sorbitan monostearate and polyoxyethylene 2 oleyl ether.

Suitable examples of amphoteric detergents are alkyl beta-imino dipropionates, and alkyl beta-amino propionates, wherein the alkyl group, generally contains 10 to 20 carbon atoms, N-lauryl betaine and basic quaternary ammonium compounds derived from 2-alkyl-substituted imidazoline.

Further examples of useful synthetic detergents may be found in "Synthetic Detergents" by A. Davidsohn and B. M. Milwidsky, Leonard Hill, London, 1967.

Typical foam builders useful in the above-identified shampoos include alkanolamides, such as lauroyl ethanolamide, and lauroyl diethanolamide. Typical viscosity control agents include natural gums, e.g. gum tragacanth; synthetic gums, e.g. carboxymethyl cellulose; synthetic polymers, e.g. polyvinyl pyrrolidone; and inorganic salts.

A typical hair dressing formulation would include from 10 to about 50% of a grooming agent; from 0 to about 40% of a solubilizing agent; from 0 to about 40% of an emollient; from about 0.0001 to about 10 percent of the adducts of this invention (I); from about 0 to about 15% of other ingredients well known to those skilled in the art, such as film-forming agents, viscosity control agents, pH control agents, colors, perfumes, etc. and the balance of the formulation being water, more particularly from 0 to about 89%. The above percents being on a weight basis.

In the above hair dressing formulations, typical grooming agents include e.g. mineral oil, castor oil, isopropyl myristate, and oleyl alcohol. Typical solubilizing agents include ethanol and propylene glycol. Typical emollients include lanolin and glycerol.

The adducts of this invention (I) may be incorporated into a formulation in any amount capable of giving the desired biocidal effect and generally from about 0.0001% to about 10% by weight, based on the total weight of the formulation, will be used. Preferably from about 0.1 to about 3% by weight and more preferably from about 0.25 to about 2% of said adducts (I) are used. However, greater or lesser amounts may be employed, if desired.

In addition to using the adducts of this invention (I) in the various cosmetic formulations, it was found that incorporation of the individual ingredients which make up the adducts, i.e. the alkaline earth metal salts and bis-(2-pyridyl-1-oxide) disulfide, also resulted in the formation of clear compositions having effective biocidal activity. The amounts used may vary from about 0.1 to 10 moles of selected alkaline earth metal salt per mole of selected bis-(2-pyridyl-1-oxide) disulfide and preferably from about 0.5 to about 3. On a weight basis the amount of selected alkaline earth metal salt may vary from about 0.4 to about 85 and preferably from about 15 to about 60 percent by weight based on the total amount of salt and disulfide used. The total concentration of the alkaline earth salt plus bis-(2-pyridyl-1-oxide) disulfide mixture can be varied from about 0.1 to about 15 percent and preferably from about 0.3 to about 2 percent by weight, based on the total weight of the formulation.

The formulations noted above are merely exemplary of the many cosmetic and other preparations in which the adducts of this invention may be used. Many other cosmetic formulations which may be used can be found in "Cosmetics — Science and Technology" by Edward Sagarun, Interscience Publishers, 1957; U.S. Pat. No. 3,236,733 with Karsten, Taylor and Parran as inventors and Canadian Patent 1,202,716 with Gerstein, Perlburg and Schwartz as inventors.

The following examples will further illustrate the method of preparing the adducts (I) and some of the formulations containing such adducts and the components thereof but are not to be considered as limiting the scope of this invention.

EXAMPLE 1

A 1-liter, 3-neck flask equipped with mechanical stirring, a reflux condenser and thermometer was charged with 33.3 g. (0.3 mole) of calcium chloride with 400 ml. of ethanol. The pH was adjusted to about 2.0 with the addition of hydrochloric acid. Stirring briefly resulted in clear solution at about 50°C. to which was added, in portions, 50.4 g. (0.2 mole) of bis-(2-pyridyl-1-oxide) disulfide during a period of ten minutes. The resulting slurry was stirred for an additional 3.5 hours at reflux. The reaction mixture was cooled to about 45 to 50°C. and the solid product was filtered off, dried over $P_2O_5$ at reduced pressure, and washed with ethanol. The yield was 67 g. (93%) of white, microcrystalline powder, showing a decomposition beginning at around 265°C. and darkening appreciably above 300°C.

Elemental Analysis:

Calc'd for: $C_{10}H_8O_2N_2S_2Cl_2Ca$: C, 33.0; H, 2.2; N, 7.72; Cl, 19.5; Ca, 11.0. Found: C, 32.84; H, 2.14; N, 7.73; Cl, 19.83; Ca, 10.79.

X-ray analysis indicated that the powder diffraction pattern did not correspond to either of the reactants or other known standard patterns and is believed to be characteristic of this new composition. Infrared analysis confirmed this result.

EXAMPLE 2

A 1-liter, 3-neck flask equipped with thermometer and refluxing condenser, was charged with 26 g. (0.216 mole) of $MgSO_4$ dissolved in 100 ml. of $H_2O$, and the pH adjusted to 2.0 with $H_2SO_4$. Then 50.2 g. (0.2 mole) of bis-(2-pyridyl-1-oxide) disulfide was added portionwise with stirring within 5 min. The resulting slurry was stirred and heated at 60°–70°C. for 0.5 hour. To the resulting slurry was added slowly 300 ml. of methyl alcohol during contined stirring and heating. The mixture was then heated and stirred at reflux for an additional 3.5 hours, following which the reaction mixture was allowed to cool to 30°–35°C. with stirring. The solid product was filtered off, washed by slurrying two times, each in 500 ml. of methyl alcohol (with stirring) at 45°–50°C., and collected on filter. The white solid was dried at 65°–70°C. under reduced pressure to yield 88.8 g. (0.19 mole), 99% yield, m.p. 210°–212°C. (decomposition).

35.0 g. of the above dried sample was subjected to azeotropic distillation with xylene to yield 4.5 g. of $H_2O$ equivalent to 12.9% of the sample. The theoretical yield of $H_2O$ was 12.7% based on a formula of $C_{10}H_8O_6N_2S_3Mg\cdot 3H_2O$.

Elemental Analysis:

Calc'd for: $C_{10}H_8O_6N_2S_3Mg\cdot 3H_2O$: C, 28.2; H, 3.3; N, 6.6; S, 22.5; Mg, 5.7. Found: C, 28.1; H, 3.2; N, 6.5; S, 22.1; Mg, 5.7.

X-ray and infrared analyses confirmed this result.

EXAMPLE 3

The same procedure as in Example 1 was followed using 25.5 g. of bis-(2-pyridyl-1-oxide) disulfide and 16.2 g. of strontium chloride ($SrCl_2$). A 30.8 g. product (95% yield) was obtained and analyses indicated it to be $(C_5H_4NOS)_2\cdot SrCl_2$.

EXAMPLE 4

The same procedure as in Example 1 was followed using 25.2 g. of bis-(2-pyridyl-1-oxide) disulfide and 24.8 g. of strontium bromide ($SrBr_2$). A 45.4 g. product (92% yield) was obtained and analyses indicated it to be $(C_5H_4NOS)_2\cdot SrBr_2$.

EXAMPLE 5

The same procedure as in Example 1 was followed using 25.2 g. of bis-(2-pyridyl-1-oxide) disulfide and 33.3 g. of barium bromide ($BaBr_2$). A product of 57.9 g. (99% yield) was obtained and analyses indicated it to be $(C_5H_4NOS)_2\cdot BaBr_2$.

EXAMPLE 10

The same procedure as in Example 1 was followed using 78 g. of bis-(2-pyridyl-1-oxide) disulfide and 56 g. of calcium nitrate $Ca(NO_3)_2$. A 123 g. product (92.5% yield) was obtained and analyses indicated it to be $(C_5H_4NOS)_2\cdot Ca(NO_3)_2$.

EXAMPLE 7

The same procedure as in Example 1 was followed using 25.2 g. of bis-(2-pyridyl-1-oxide) disulfide and 35 g. of barium chlorate $Ba(ClO_3)_2\cdot H_2O$. A 56 g. product (74% yield) was obtained and analyses indicated it to be $(C_5H_4NOS)_2\cdot Ba(ClO_3)_2\cdot H_2O$.

Several shampoo and hair dressing compositions were prepared containing the formulations shown in Tables I and II. Several examples showing these formulations in combination with the adducts (I) of this invention are described below.

TABLE I

| Ingredients | Shampoo Compositions Code No. | | | | | |
|---|---|---|---|---|---|---|
| | 1 | 2 | 3 | 4 | 5 | 6 |
| triethanolamine lauryl sulfate | 35 | | | | | |
| sodium lauryl sulfate | | 35 | | | | |
| diethanolamine lauryl sulfate | | | 30 | | | |
| triethanolamine alkyl aryl sulfonate | | 16 | | | | |
| ammonium ethoxy-lauryl sulfate | | | | | | |
| sodium lauryl ether sulfate | | | | | | |
| sodium lanolin ether sulfate | | | | | | |
| Duponol XL[1] polyoxyethylene Sorbitan monoleate | | 4 | | | 40 | |
| sulfated vegetable oil | | | | | | 45 |
| alkanolamide | 5 | | 4 | 6 | 3 | |
| mineral oil | | | | | | 15 |
| glycerol | | | | | | |
| Natrosol 250HH[2] | 1 | | | | | |
| Oleyl alcohol | | | | | | |
| propylene glycol | | | | | | |
| NaCl | | | | | | |
| Miranol C 2M Conc.[3] | | | | | | |
| water | 59 | 80 | 61 | 64 | 57 | 40 |

| Ingredients | 7 | 8 | 9 | 10 | 11 | 12 |
|---|---|---|---|---|---|---|
| triethanolamine lauryl sulfate | | | | 20 | 35 | 20 |
| sodium lauryl sulfate | | 20 | | | | |
| diethanolamine lauryl sulfate | | | | | | |
| triethanolamine alkyl aryl sulfonate | | | | | | |
| ammonium ethoxy-lauryl sulfate | | 20 | | | | |
| sodium lauryl ether sulfate | | | 20 | | | |
| sodium lanolin ether sulfate | | | | 12 | | |
| Duponol XL[1] polyoxyethylene Sorbitan monoleate | | | | | | |
| sulfated vegetable oil | 50 | | | | | |
| alkanolamide | | 3 | 5 | 4 | 5 | 1 |
| mineral oil | 3 | | | | | |
| glycerol | 3.5 | | | | | |
| Natrosol 250HH[2] | | | | | | |
| Oleyl alcohol | | | 0.5 | | | |
| propylene glycol | | | | | | 2 |
| NaCl | | | 0.5 | 0.7 | | |
| Miranol C 2M Conc.[3] | | | | | | 20 |
| water | 43.5 | 77 | 54 | 63.3 | 60 | 57 |

[1]Anionic - amphoteric surfactant of alcohol sulfate type
[2]hydroxylethylether of cellulose
[3]1-ethoxyethionic acid-1-ethionic acid-5-cocoylcycloimidinium hydroxide, disodium salt.

The pH of the above compositions was adjusted to 7.4 with HCl and perfume was added in a sufficient quantity to give desired effects.

TABLE II

| Ingredients | Hair Dressing Compositions Code No. | |
|---|---|---|
| | 13 | 14 |
| glycerol | 40.0 | |
| ethyl alcohol | 40.0 | |
| Atlas G-1790[1] | | 15.0 |
| water | 20.0 | 85.0 |

[1]-polyoxyethylene 20 lanolin derivative

The pH of the above compositions was adjusted to 7.4 with HCl and perfume was added in a sufficient quantity to give desired effects.

EXAMPLE 8

A clear hair shampoo composition having the following formulation was prepared:

| | Percent by Weight |
|---|---|
| Hair shampoo composition No. 11 | 98.5 |
| $(C_5H_4NOS)_2\cdot CaCl_2$ | 1.5 |
| | 100.0 |

The pH of the above formulation was adjusted to 7.2. This formulation was tested for biocidal activity against P. ovale using in vitro serial dilution analysis. This method of analysis involved adding the test compound to several tubes containing inoculated broths in different concentration so that a range of concentrations is established. The tubes are mixed and incubated at appropriate temperatures (37°C. for most bacteria and yeasts, 28°C. for molds). After 24 hours incubation, the number of organisms remaining in the inoculated tubes of bacteria or yeast are determined by routine agar plating methods or through the use of a Coulter Electronic Particle Counter (samples inoculated with molds are measured after 7 days using agar plating methods). The minimal lethal concentration (M.L.C.) is recorded as the lowest concentration of a compound which completely destroys population of organisms within a given limit of time. The minimal lethal concentration (M.L.C.) was found to be 4.5 ppm. and the same formulation without the adduct added had a M.L.C. of >150 ppm. (for P. ovale).

The substantive properties of the tested formulations were determined by means of agar plate zone of inhibition testing. This testing involved placing discs (~12.5 mm.) of treated untanned calf skin upon the surface of agar plates previously seeded with test organisms. Upon incubation at the optimum temperature, the activity of the test compound is reflected by zones of no-growth beneath and/or surrounding the test discs, i.e. the zone of inhibition.

Substantivity to calf skin was determined for a number of organisms with the following results:

| Organism | Inhib.Zone-Diameter (mm.) |
|---|---|
| Salmonella typhimurium | 34 |
| Salmonella enteritidis | 35 |
| Escherichia coli 9637 | 38 |
| Escherichia coli 10536 | 15 |
| Staphylococcus aureus | 32 |
| Klebsiella pneumoniae | 23 |
| Pitysporium ovale | 18 |

The same formulation without the adduct showed an inhibition zone of 3 mm. diameter for S. aureus.

Similar formulations were prepared containing 0.25, 1.0 and 2.0 percent by weight of the $(C_5H_4NOS)_2\cdot CaCl_2$ adduct. Substantivity to calf skin for these formulations showed an inhibition zone of 30, 39 and 36 mm. respectively for S. aureus.

EXAMPLE 9

A clear hair shampoo composition having the following formulation was prepared:

| | Percent by Weight |
|---|---|
| Hair shampoo composition No. 11 | 98.5 |
| $(C_5H_4NOS)_2\cdot MgSO_4\cdot 3H_2O$ | 1.5 |
| | 100.0 |

The pH of the above formulation was adjusted to 7.2. The biocidal activity for P. ovale was found to be 1.5 ppm. as compared with >150 ppm. for a sample of the formulation without the magnesium sulfate adduct.

Substantivity to calf skin was determined for a number of organisms with the following results:

| Organism | Inhib.Zone-Diameter (mm.) |
|---|---|
| Salmonella typhimurium | 33 |
| Salmonella enteritidis | 33 |
| Escherichia coli 9637 | 33 |
| Escherichia coli 10536 | 17 |
| Staphylococcus aureus | 31 |
| Klebsiella pneumoniae | 20 |
| Pitysporium ovale | 18 |

The same formulation without the adduct showed an inhib. zone of only 3 mm. diameter for S. aureus.

A similar formulation containing 0.25 percent by weight of the magnesium sulfate adduct showed a substantivity (calf skin) of 7 mm. for S. aureus.

In Example 9 noted above and in the remaining examples, the tests for biocidal activity and substantivity to calf skin were carried out in the manner described in Example 8.

EXAMPLE 10

A clear hair shampoo composition having the following formulation was prepared:

| | Percent by Weight |
|---|---|
| Hair shampoo composition No. 1 | 99.5 |
| $(C_5H_4NOS)_2\cdot MgSO_4\cdot 3H_2O$ | 0.5 |
| | 100.0 |

The pH of the formulation was adjusted to 7.3. Substantivity to calf skin was determined to be 33 mm. for S. aureus as compared with 30 mm. for a formulation without the adduct.

EXAMPLE 11

A clear hair shampoo composition having the following formulation was prepared:

| | Percent by Weight |
|---|---|
| Hair shampoo composition No. 1 | 99.5 |
| $(C_5H_4NOS)_2\cdot CaCl_2$ | 0.5 |
| | 100.0 |

The pH of the above formulation was adjusted to 7.2. The biocidal activity for P. ovale was found to be 0.25 ppm. as compared with >150 ppm. for a sample of the formulation without the calcium chloride adduct.

EXAMPLE 12

A clear hair shampoo composition having the following formulation was prepared:

| | Percent by Weight |
|---|---|
| Hair shampoo composition No. 2 | 99.0 |
| $(C_5H_4NOS)_2\cdot CaCl_2$ | 1.0 |
| | 100.0 |

The pH of this formulation was adjusted to 7.2. The biocidal activity for P. ovale was found to be 0.12 ppm.

as compared to >150 ppm. for a sample of the formulation without the calcium chloride adduct. Substantivity to calf skin was determined to be 38 mm. for *S. aureus* as compared to 24 mm. for a formulation without the adduct.

EXAMPLE 13

A clear hair shampoo composition having the following formulation was prepared:

|  | Percent by Weight |
|---|---|
| Hair shampoo composition No. 2 | 99.0 |
| $(C_5H_4NOS)_2 \cdot MgSO_4 \cdot 3H_2O$ | 1.0 |
|  | 100.0 |

The pH of the above formulation was adjusted to 6.2. Substantivity to calf skin was determined to be 28 mm. for S. aureus as compared to 24 mm. for a formulation without the adduct.

EXAMPLE 14

A clear hair shampoo composition having the following formulation was prepared:

|  | Percent by Weight |
|---|---|
| Hair shampoo composition No. 3 | 98.5 |
| $(C_5H_4NOS)_2 \cdot CaCl_2$ | 1.5 |
|  | 100.0 |

The pH of this formulation was adjusted to 7.3. The biocidal activity for P. ovale was found to be 0.25 ppm. as compared with >150 ppm. for a sample of the formulation without the adduct.

EXAMPLE 15

A clear hair shampoo composition having the following formulation was prepared:

|  | Percent by Weight |
|---|---|
| Hair shampoo composition No. 4 | 98.5 |
| $(C_5H_4NOS)_2 \cdot CaCl_2$ | 1.5 |
|  | 100.0 |

The pH of the formulation was adjusted to 7.2. The biocidal acitivity for P. ovale was found to be 0.5 ppm. as compared with >150 ppm. for a sample of the formulation without the adduct.

EXAMPLE 16

A clear hair shampoo composition having the following formulation was prepared:

|  | Percent by Weight |
|---|---|
| Hair shampoo composition No. 4 | 98.5 |
| $(C_5H_4NOS)_2 \cdot MgSO_4 \cdot 3H_2O$ | 1.5 |
|  | 100.0 |

The pH of this formulation was adjusted to 7.3. Substantivity to calf skin was determined to be 32 mm. for S. aureus as compared to 28 mm. for a formulation without the adduct.

EXAMPLE 17

A clear hair shampoo composition having the following formulation was prepared:

|  | Percent by Weight |
|---|---|
| Hair shampoo composition No. 5 | 99.25 |
| $(C_5H_4NOS)_2 \cdot CaCl_2$ | 0.75 |
|  | 100.00 |

The pH of this formulation was adjusted to 7.2. The biocidal activity for P. ovale was found to be 0.5 ppm. as compared with >150 ppm. for a sample of this formulation without the adduct.

EXAMPLE 18

A clear hair shampoo composition having the following formulation was prepared:

|  | Percent by Weight |
|---|---|
| Hair shampoo composition No. 5 | 98.5 |
| $(C_5H_4NOS)_2 \cdot MgSO_4 \cdot 3H_2O$ | 1.5 |
|  | 100.0 |

The pH of this formulation was adjusted to 7.3. Substantivity to calf skin was determined to be 36 mm. for S. aureus as compared to 28 mm. for a sample of the formulation without the adduct.

EXAMPLE 19

A clear hair shampoo composition having the following formulation was prepared:

|  | Percent by Weight |
|---|---|
| Hair shampoo composition No. 6 | 99.0 |
| $(C_5H_4NOS)_2 \cdot CaCl_2$ | 1.0 |
|  | 100.0 |

The pH of this formulation was adjusted to 6.2. The biocidal activity for P. ovale was found to be 0.25 ppm. as compared with >150 ppm. for a sample of the formulation without the adduct.

EXAMPLE 20

A clear hair shampoo composition having the following formulation was prepared:

|  | Percent by Weight |
|---|---|
| Hair shampoo composition No. 7 | 99.5 |
| $(C_5H_4NOS)_2 \cdot CaCl_2$ | 0.5 |
|  | 100.0 |

The pH of this formulation was adjusted to 6.5. Substantivity to calf skin was determined to be 34 mm. for S. aureus.

EXAMPLE 21

A clear hair shampoo composition having the following formulation was prepared:

|  | Percent by Weight |
|---|---|
| Hair shampoo composition No. 8 | 98.5 |

-Continued

| | |
|---|---|
| $(C_5H_4NOS)_2 \cdot CaCl_2$ | 1.5 |
| | 100.0 |

The pH of the above formulation was adjusted to 6.2. The biocidal activity for P. ovale was found to be 0.5 ppm. as compared with >50 ppm. for a sample of the formulation without the adduct.

EXAMPLE 22

A clear hair shampoo composition having the following formulation was prepared:

| | Percent by Weight |
|---|---|
| Hair shampoo composition No. 8 | 98.5 |
| $(C_5H_4NOS)_2 \cdot MgSO_4 \cdot 3H_2O$ | 1.5 |
| | 100.0 |

The pH of this formulation was adjusted to 7.3. Substantivity to calf skin was determined to be 39 mm. for S. aureus as compared to 30 mm. for a sample of the formulation without the adduct.

EXAMPLE 23

A clear hair shampoo composition having the following formulation was prepared:

| | Percent by Weight |
|---|---|
| Hair shampoo composition No. 9 | 98.5 |
| $(C_5H_4NOS)_2 \cdot CaCl_2$ | 1.5 |
| | 100.0 |

The pH of this formulation was adjusted to 7.2. The biocidal acitivity for P. ovale was found to be 0.2 ppm. as compared with >50 ppm. for a sample of the formulation without the adduct.

EXAMPLE 24

A clear hair shampoo composition having the following formulation was prepared:

| | Percent by Weight |
|---|---|
| Hair shampoo composition No. 9 | 99.0 |
| $(C_5H_4NOS)_2 \cdot MgSO_4 \cdot 3H_2O$ | 1.0 |
| | 100.0 |

The pH of this formulation was adjusted to 6.2. Substantivity of calf skin was determined to be 32 mm. for S. aureus as compared to 28 mm. for a sample of the formulation without the adduct.

EXAMPLE 25

A clear hair shampoo composition having the following formulation was prepared:

| | Percent by Weight |
|---|---|
| Hair shampoo composition No. 10 | 99.0 |
| $(C_5H_4NOS)_2 \cdot CaCl_2$ | 1.0 |
| | 100.0 |

The pH of this formulation was adjusted to 7.0. The biocidal activity for P. ovale was found to be 1.5 ppm. as compared with >50 ppm. for a sample of the formulation without the adduct.

EXAMPLE 26

A clear hair shampoo composition having the following formulation was prepared:

| | Percent by Weight |
|---|---|
| Hair shampoo composition No. 10 | 99.5 |
| $(C_5H_4NOS)_2 \cdot MgSO_4 \cdot 3H_2O$ | 0.5 |
| | 100.0 |

The pH of this formulation was adjusted to 7.3. Substantivity to calf skin was determined to be 31 mm. for S. aureus.

EXAMPLE 27

A clear hair dressing composition having the following formulation was prepared:

| | Percent by Weight |
|---|---|
| Hair dressing composition No. 13 | 99.5 |
| $(C_5H_4NOS)_2 \cdot CaCl_2$ | 0.5 |
| | 100.0 |

The pH of this formulation was adjusted to 6.2. The biocidal activity against P. ovale was found to be 0.15 ppm. as compared with >50 ppm. for a sample of the formulation without the adduct.

EXAMPLE 28

A clear hair dressing composition having the following formulation was prepared:

| | Percent by Weight |
|---|---|
| Hair dressing composition No. 14 | 99.5 |
| $(C_5H_4NOS)_2 \cdot CaCl_2$ | 0.5 |
| | 100.0 |

The pH of this formulation was adjusted to 6.2. The biocidal activity against P. ovale was found to be 0.15 ppm. as compared with >50 ppm. for a sample of the formulation without the adduct.

EXAMPLE 29

A clear antiseptic and disinfectant composition having the following formulation was prepared:

| | Percent by Weight |
|---|---|
| Water | 98.5 |
| $(C_5H_4NOS)_2 \cdot CaCl_2$ | 1.5 |
| | 100.0 |

The pH of this formulation was adjusted to 7.2. The biocidal activity for this formulation was determined for several organisms with the results as indicated below:

| Organism | Minimal Lethal Concentration - ppm. |
|---|---|
| *Aspergillus niger* | 15 |
| *Penicillium vermiculatum* | 15 |
| *Epidermophyton floccosum* | 3 |
| *Trichophyton mentagrophytes* | 3 |
| *Candida albicans* | 6 |
| *Saccharomyces cerevisiae* | 1.5 |

-Continued

| Organism | Minimal Lethal Concentration - ppm. |
| --- | --- |
| Staphylococcus aureus | 25 |
| Bacillus subtilis | 60 |
| Pseudomonas aeruginosa | 115 |
| Escherichia coli | 60 |

EXAMPLE 30

A clear antiseptic and disinfectant composition having the following formulation was prepared:

| | Percent by Weight |
| --- | --- |
| Water | 98.5 |
| $(C_5H_4NOS)_2 \cdot MgSO_4 \cdot 3H_2O$ | 1.5 |
| | 100.0 |

The pH of this formulation was adjusted to 7.2. The biocidal activity for several organisms was determined with the following results:

| Organism | Minimal Lethal Concentration - ppm. |
| --- | --- |
| Aspergillus niger | 15 |
| Penicillium vermiculatum | 15 |
| Epidermophyton floccosum | 3 |
| Trichophyton mentagrophytes | 4.5 |
| Candida albicans | 6 |
| Saccharomyces cerevisiae | 1.5 |
| Staphylococcus aureus | 25 |
| Bacillus subtilis | 55 |
| Pseudomonas aeruginosa | 120 |
| Escherichia coli | 55 |

EXAMPLE 31

A clear hair shampoo composition having the following formulation was prepared:

| | Percent by Weight |
| --- | --- |
| Hair shampoo composition No. 2 | 99.00 |
| Bis-(2-pyridyl-1-oxide) disulfide | 0.68 |
| Magnesium sulfate | 0.32 |
| | 100.0 |

The pH of this formulation was adjusted to 6.3. The substantivity to calf skin was determined for several organisms with the following results:

| Organism | Inhib. Zone - diameter (mm.) |
| --- | --- |
| Pseudomonas aeruginosa 15442 | 27 |
| Staphylococcus aureus | 32 |
| Salmonella typhimurium | 18 |

EXAMPLE 32

A clear hair shampoo having the following formulation was prepared:

| | Percent by Weight |
| --- | --- |
| Hair shampoo composition No. 2 | 99.0 |
| Bis-(2-pyridyl-1-oxide) disulfide | 0.69 |
| Calcium chloride | 0.31 |
| | 100.00 |

The pH of the formulation was adjusted to 7.2. The substantivity to calf skin was determined for several organisms with the following results:

| Organism | Inhib.Zone - diameter (mm.) |
| --- | --- |
| Pseudomonas aeruginosa 15442 | 30 |
| Staphylococcus aureus | 36 |
| Salmonella typhimurium | 36 |

The same formulation without the disulfide and calcium chloride resulted in inhibition zones of 23, 30 and 18 mm. respectively.

EXAMPPLE 33

A clear hair shampoo composition having the following formulation was prepared:

| | Percent by Weight |
| --- | --- |
| Hair shampoo composition No. 12 | 99.49 |
| Bis-(2-pyridyl-1-oxide) disulfide | 0.35 |
| Magnesium sulfate | 0.16 |
| | 100.00 |

The pH of this formulation was adjusted to 7.3. The substantivity to calf skin was determined for several organisms with the following results:

| Organism | Inhib. Zone - diameter (mm.) |
| --- | --- |
| Pseudomonas aeruginosa | 31 |
| Staphylococcus aureus | 30 |
| Salmonella typhimurium | 22 |

The same formulation without the disulfide and magnesium sulfate resulted in inhibition zones of 18, 25 and 18 mm. respectively.

EXAMPLE 34

A clear hair shampoo composition having the following formulation was prepared:

| | Percent by Weight |
| --- | --- |
| Hair shampoo composition No. 12 | 99.49 |
| Bis-(2-pyridyl-1-oxide) disulfide | 0.36 |
| Calcium chloride | 0.15 |
| | 100.00 |

The pH of this formulation was adjusted to 6.8. The substantivity to calf skin was determined for several organisms with the following results:

| Organism | Inhib.Zone - diameter (mm) |
| --- | --- |
| Pseudomonas aeruginosa | 20 |
| Staphylococcus aureus | 26 |
| Salmonella typhimurium | 22 |

The same formulation without the disulfide and calcium chloride resulted in inhibition zones of 18, 25 and 18 mm. respectively.

EXAMPLE 35

A clear antiseptic and disinfectant composition was prepared having the following formulation:

| | Percent by Weight |
|---|---|
| Water | 98.50 |
| Bis-(2-pyridyl-1-oxide) disulfide | 1.06 |
| Calcium chloride | 0.44 |
| | 100.00 |

The pH of this formulation was adjusted to 6.3. The biocidal activity for this formulation was determined for several organisms with the results as indicated below:

| Organism | Minimal Lethal Conc. - ppm |
|---|---|
| Aspergillus niger | 15 |
| Penicillium vermiculatum | 15 |
| Epitermophyton floccosum | 3 |
| Trichophyton mentagrophytes | 3 |
| Candida albicans | 9 |
| Saccharomyces cerevisiae | 3 |
| Staphylococcus aureus | 25 |
| Bacillus subtilis | 70 |
| Pseudomonas aeruginosa | 120 |
| Escherichia coli | 45 |

EXAMPLE 36

A clear antiseptic and disinfectant composition was prepared having the following formulation:

| | Percent by Weight |
|---|---|
| Water | 98.50 |
| Bis-(2-pyridyl-1-oxide) disulfide | 1.02 |
| Magnesium sulfate | 0.48 |
| | 100.00 |

The pH of this formulation was adjusted to 6.3. The biocidal activity of this formulation was determined for several organisms with the results as indicated below:

| Organism | Minimal Lethal Conc. - ppm. |
|---|---|
| Aspergillus niger | 15 |
| Penicillium vermiculatum | 15 |
| Epidermophyton floccosum | 3 |
| Trichophyton mentagrophytes | 6 |
| Candida albicans | 6 |
| Saccharomyces cerevisiae | 1.5 |
| Staphylococcus aureus | 25 |
| Bacillus subtilis | 70 |
| Pseudomonas aeruginosa | 150 |
| Escherichia coli | 50 |

What is claimed is:

1. A clear hair shampoo composition comprising from about 10 to about 85% by weight of a synthetic detergent, from 0 to about 10% by weight of a foam builder, from 0 to about 5% by weight of a viscosity control agent, from about 0.001 to about 10% by weight of an adduct having the empirical formula:

$$(C_5H_4NOS)_2MY_t$$

or hydrate thereof, wherein M is an alkaline earth metal selected from the group consisting of calcium, magnesium, barium and strontium; Y is an anion selected from the group consisting of halide, sulfate, nitrate, chlorate and acetate and $t$ is 1 or 2 and from 0 to about 89% by weight of water.

2. The composition of claim 1 wherein M is calcium, Y is chloride and $t$ is 2.

3. The composition of claim 1 wherein M is magnesium, Y is sulfate and $t$ is 1.

4. The composition of claim 1 wherein said adduct has the formula:

$$(C_5H_4NOS)_2MgSO_4 \cdot 3H_2O.$$

5. The composition of claim 1 wherein the amount of said adduct is from about 0.1 to about 3 percent by weight.

6. The composition of claim 1 wherein the amount of said adduct is from about 0.25 to about 2 percent by weight.

7. The composition of claim 6 wherein said adduct is selected from the group consisting of $(C_5H_4NOS)_2CaCl_2$, $(C_5H_4NOS)_2MgSO_4$ and $(C_5H_4NOS)_2MgSO_4 \cdot 3H_2O$.

8. A clear hair dressing composition comprising from about 10 to about 50% by weight of a grooming agent, from 0 to about 40% by weight of a solubilizing agent, from about 0.0001 to about 10% by weight of an adduct having the empirical formula:

$$(C_5H_4NOS)_2MY_t$$

or hydrate thereof, wherein M is an alkaline earth metal selected from the group consisting of calcium, magnesium, barium and strontium; Y is an anion selected from the group consisting of halide, sulfate, nitrate, chlorate and acetate and $t$ is 1 or 2 and from 0 to about 89% by weight of water.

9. The composition of claim 8 wherein M is calcium, Y is chloride and $t$ is 2.

10. The composition of claim 8 wherein M is magnesium, Y is sulfate and $t$ is 1.

11. The composition of claim 8 wherein said adduct has the formula:

$$(C_5H_4NOS)_2MgSO_4 \cdot 3H_2O.$$

12. The composition of claim 8 wherein the amount of said adduct is from about 0.1 to about 3 percent weight.

13. The composition of claim 8 wherein the amount of said adduct is from about 0.25 to about 2 percent by weight.

14. The composition of claim 13 wherein said adduct is selected from the group consisting of $(C_5H_4NOS)_2CaCl_2$, $(C_5H_4NOS)_2MgSO_4$ and $(C_5H_4NOS)_2MgSO_4 \cdot 3H_2O$.

15. A clear antiseptic and disinfectant composition comprising a mixture of water and an effective amount of an adduct having the empirical formula:

$$(C_5H_4NOS)_2MY_t$$

or hydrate thereof, wherein M is an alkaline earth metal selected from the group consisting of calcium, magnesium, barium and strontium; Y is an anion selected from the group consisting of halide, sulfate, nitrate, chlorate and acetate and $t$ is 1 or 2.

16. The composition of claim 15 wherein M is calcium, Y is chloride and $t$ is 2.

17. The composition of claim 15 wherein M is magnesium, Y is sulfate and $t$ is 1.

18. The composition of claim 15 wherein the amount of said adduct is from about 0.1 to about 3 percent by weight.

19. The composition of claim 15 wherein the amount of said adduct is from about 0.25 to about 2 percent by weight.

20. The composition of claim 19 wherein said adduct is selected from the group consisting of $(C_5H_4NOS)_2CaCl_2$, $(C_5H_4NOS)_2MgSO_4$ and $(C_5H_4NOS)_2MgSO_4 \cdot 3H_2O$.

21. A clear hair shampoo composition comprising from about 10 to about 85% by weight of a synthetic detergent, from 0 to about 10% by weight of a foam builder, from 0 to about 5% of a viscosity control agent, from 0 to about 89 percent by weight water and from about 0.1 to about 15% by weight of a mixture of bis-(2-pyridyl-1-oxide) disulfide and an alkaline earth metal salt of the formula:

$$MY_t$$

wherein M is an alkaline earth metal selected from the group consisting of calcium, magnesium, barium and strontium; Y is an anion selected from the group consisting of halide, sulfate, nitrate, chlorate and acetate and $t$ is 1 or 2 wherein said mixture contains from about 0.4 to about 85 percent by weight of said alkaline earth metal salt.

22. The composition of claim 21 wherein the amount of said mixture is from about 0.3 to about 2 percent by weight and said alkaline earth metal salt is selected from the group consisting of $CaCl_2$ and $MgSO_4$.

23. A clear hair dressing composition comprising from about 10 to about 50% by weight of a grooming agent, from 0 to about 40% by weight of a solubilizing agent, from 0 to about 89 percent by weight water and from about 0.1 to about 15% by weight of a mixture of bis-(2-pyridyl-1-oxide) disulfide and an alkaline earth metal salt of the formula:

$$MY_t$$

wherein M is an alkaline earth metal selected from the group consisting of calcium, magnesium, barium and strontium; Y is an anion selected from the group consisting of halide, sulfate, nitrate, chlorate and acetate and $t$ is 1 or 2 wherein said mixture contains from about 0.4 to about 85% by weight of said alkaline earth metal salt.

24. The composition of claim 23 wherein the amount of said mixture is from about 0.3 to about 2 percent by weight and said alkaline earth metal salt is selected from the group consisting of $CaCl_2$ and $MgSO_4$.

25. A clear antiseptic and disinfectant composition comprising a mixture of water and from about 0.1 to about 15 percent by weight of a mixture of bis-(2-pyridyl-1-oxide) disulfide and an alkaline earth metal salt of the formula:

$$MY_t$$

wherein M is an alkaline earth metal selected from the group consisting of calcium, magnesium, barium and strontium; Y is an anion selected from the group consisting of halide, sulfate, nitrate, chlorate and acetate and $t$ is 1 or 2 wherein said mixture contains from about 0.4 to about 85% by weight of said alkaline earth metal salt.

26. The composition of claim 25 wherein the amount of said mixture is from about 0.3 to about 2 percent by weight and said alkaline earth metal salt is selected from the group consisting of $CaCl_2$ and $MgSO_4$.

* * * * *

PO-1050
(5/69)

UNITED STATES PATENT OFFICE
CERTIFICATE OF CORRECTION

Patent No. 3,890,434     Dated June 17, 1975

Inventor(s) Guenter K. Weisse, Haywood Hooks, Jr., Gene A. Hyde and Samuel I. Trotz It is certified that error appears in the above-identified patent and that said Letters Patent are hereby corrected as shown below:

On the title page, the inventor's name should correctly be spelled as follows:

Guenter K. Weisse

In column 1, line 36, the word "is" should read --it--.

In column 5, line 16, "25.5" should read --25.2--.

In column 5, line 35, "EXAMPLE 10" should read --EXAMPLE 6--.

In column 11, line 51, the word "of" should read --to--.

In column 14, line 17, "EXAMPPLE 33" should read --EXAMPLE 33--.

In column 16, line 45, after the word "percent" insert --by--.

Signed and Sealed this fourteenth Day of October 1975

[SEAL]

Attest:

RUTH C. MASON
*Attesting Officer*

C. MARSHALL DANN
*Commissioner of Patents and Trademarks*